(12) United States Patent
Borran et al.

(10) Patent No.: US 8,553,575 B2
(45) Date of Patent: Oct. 8, 2013

(54) RESOURCE PARTITIONING FOR UPLINK IN A WIRELESS COMMUNICATION NETWORK

(75) Inventors: Jaber Mohammad Borran, San Diego, CA (US); Aamod Dinkar Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 529 days.

(21) Appl. No.: 12/725,137

(22) Filed: Mar. 16, 2010

(65) Prior Publication Data

US 2010/0238885 A1 Sep. 23, 2010

Related U.S. Application Data

(60) Provisional application No. 61/161,652, filed on Mar. 19, 2009.

(51) Int. Cl.
| H04W 16/10 | (2009.01) |
| H04W 72/04 | (2009.01) |
| H04W 52/30 | (2009.01) |
| H04W 72/12 | (2009.01) |

(52) U.S. Cl.
USPC ........... 370/252; 370/329; 455/450; 455/522; 375/346

(58) Field of Classification Search
USPC ......... 370/252, 329, 331; 375/346; 455/450, 455/522
See application file for complete search history.

(56) References Cited

U.S. PATENT DOCUMENTS

| 8,116,800 | B2 * | 2/2012 | Gorokhov et al. | 455/522 |
| 8,219,030 | B2 * | 7/2012 | Gorokhov et al. | 455/62 |
| 8,259,601 | B2 * | 9/2012 | Fu | 370/252 |
| 8,279,795 | B2 * | 10/2012 | Lee et al. | 370/315 |
| 8,412,249 | B2 * | 4/2013 | Cheng et al. | 455/512 |
| 2004/0219920 | A1 * | 11/2004 | Love et al. | 455/442 |
| 2005/0096051 | A1 * | 5/2005 | Lee et al. | 455/438 |

(Continued)

FOREIGN PATENT DOCUMENTS

| EP | 1708536 A2 | 10/2006 |
| TW | 200838185 A | 9/2008 |

(Continued)

OTHER PUBLICATIONS

International Search Report and Written Opinion—PCT/U S2010/027358, International Search Authority—European Patent Office—Jul. 12, 2010.

(Continued)

*Primary Examiner* — Ahmed Elallam
(74) *Attorney, Agent, or Firm* — Nerrie M. Zohn

(57) ABSTRACT

Techniques for performing resource partitioning are described. In an aspect, adaptive resource partitioning may be performed to dynamically allocate available resources for the uplink to nodes, e.g., base stations. Each node may be assigned a list of target interference-over-thermal (IoT) levels for the available resources by the adaptive resource partitioning. Each node may obtain a list of target IoT levels for itself and at least one list of target IoT levels for at least one neighbor node. The list of target IoT levels for each node may include a configurable target IoT level on each available resource for the node. Each node may schedule its UEs for transmission on the available resources (e.g., may determine transmit power levels and rates for the UEs) based on the target IoT levels for itself and the neighbor node(s) such that the target IoT levels for the neighbor node(s) can be met.

24 Claims, 7 Drawing Sheets

(56) References Cited

U.S. PATENT DOCUMENTS

| | | | |
|---|---|---|---|
| 2008/0161033 A1* | 7/2008 | Borran et al. | 455/522 |
| 2008/0188260 A1* | 8/2008 | Xiao et al. | 455/522 |
| 2009/0082052 A1* | 3/2009 | Bhushan et al. | 455/522 |
| 2010/0056153 A1* | 3/2010 | Attar et al. | 455/436 |
| 2010/0238826 A1* | 9/2010 | Borran et al. | 370/252 |
| 2010/0238827 A1* | 9/2010 | Borran et al. | 370/252 |
| 2010/0238883 A1* | 9/2010 | Borran et al. | 370/329 |
| 2010/0238884 A1* | 9/2010 | Borran et al. | 370/329 |
| 2013/0065624 A1 | 3/2013 | Borran et al. | |
| 2013/0148559 A1* | 6/2013 | Senarath et al. | 370/311 |

FOREIGN PATENT DOCUMENTS

| | | |
|---|---|---|
| TW | 200908635 | 2/2009 |
| WO | WO2007149616 | 12/2007 |
| WO | WO2008067471 | 6/2008 |
| WO | WO2008157799 | 12/2008 |
| WO | WO2009054604 | 4/2009 |
| WO | WO2009132133 | 10/2009 |

OTHER PUBLICATIONS

Qualcomm Europe: "Inter-cell interference control" 3GPP Draft; RI-070442, 3rd Generation Partnership Project (36PP), Mobile Competence Centre; 650, Route Des Lucioles; F-06921 Sophia-Antipolis Cedex; France, vol. RAN WGI, no. Sorrento, Italy; Jan. 10, 2007.

International Search Report and Written Opinion—PCT/US2010/028048—ISA/EPO—Dec. 7, 2010.

Taiwan Search Report—TW099108247—TIPO—May 28, 2013.

* cited by examiner

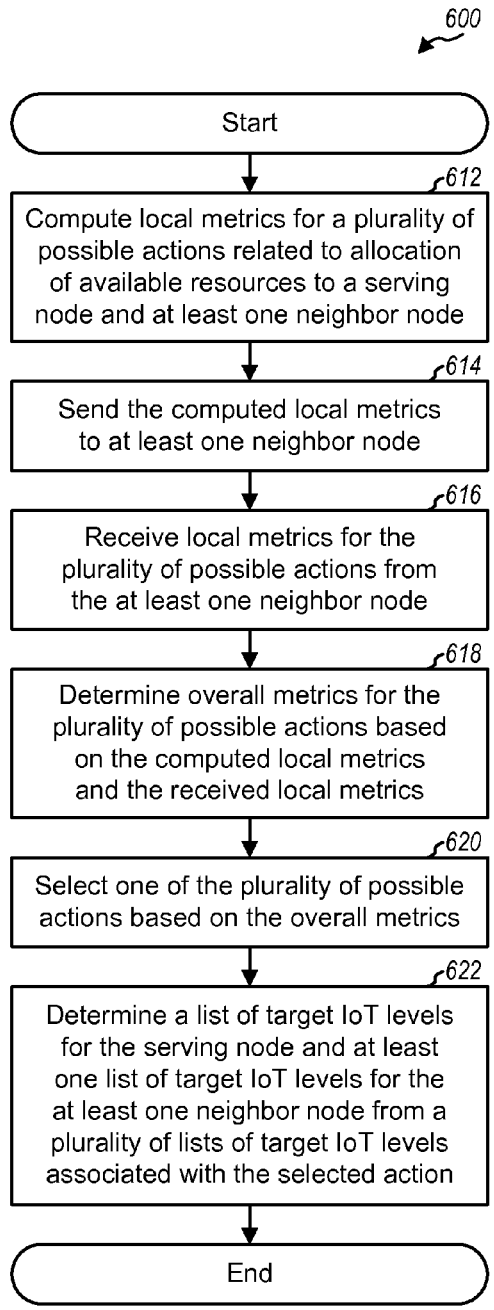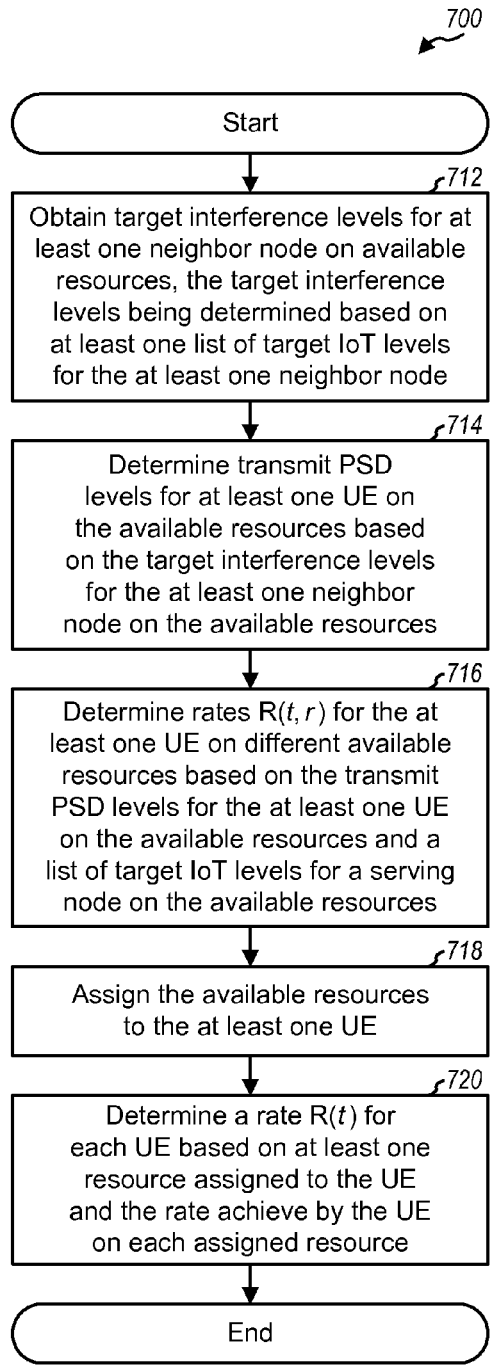
FIG. 6
FIG. 7

RESOURCE PARTITIONING FOR UPLINK IN A WIRELESS COMMUNICATION NETWORK

The present application claims priority to provisional U.S. Application Ser. No. 61/161,652, entitled "ASSOCIATION AND RESOURCE COORDINATING FOR UPLINK IN HETEROGENEOUS NETWORKS," filed Mar. 19, 2009, assigned to the assignee hereof and incorporated herein by reference.

BACKGROUND

I. Field

The present disclosure relates generally to communication, and more specifically to techniques for supporting wireless communication.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may serve one or more UEs at any given moment. On the uplink, a transmission from a UE may observe interference due to transmissions from other UEs communicating with neighbor base stations. The transmission from the UE may also cause interference to the transmissions from the other UEs. The interference may degrade the performance of all affected UEs. It may be desirable to mitigate interference in order to improve performance.

SUMMARY

Techniques for performing resource partitioning for the uplink to improve performance are described herein. Resource partitioning refers to a process to allocate available resources to nodes. A node may be a base station, a relay station, or some other entity. In an aspect, available resources for the uplink may be dynamically allocated to nodes by assigning each node with a list of target interference-over-thermal (IoT) levels for the available resources. Each node may schedule its UEs for transmission on the available resources such that the target IoT levels for neighbor nodes can be met.

In one design, a serving node for at least one UE may obtain a list of target IoT levels for itself and at least one list of target IoT levels for at least one neighbor node. The list of target IoT levels for each node may include a configurable target IoT level on each available resource for that node. The serving node may schedule the at least one UE for transmission on the available resources based on the lists of target IoT levels for the serving and neighbor nodes.

In one design of adaptive resource partitioning, the serving node may compute local metrics for a plurality of possible actions related to allocation of the available resources to the serving and neighbor nodes. Each possible action may be associated with specific lists of target IoT levels for the serving and neighbor nodes. The serving node may send the computed local metrics to the neighbor node(s) and may receive local metrics for different possible actions from the neighbor node(s). The serving node may determine overall metrics for the possible actions based on the computed local metrics and the received local metrics. The serving node may select one possible action based on the overall metrics and may determine a list of target IoT levels for each node based on the lists of target IoT levels associated with the selected action.

In one design of scheduling, the serving node may determine target interference levels for the neighbor node(s) on the available resources based on the target IoT levels for the neighbor node(s). The serving node may determine transmit power spectral density (PSD) levels for the UE(s) on the available resources based on the target interference levels for the neighbor node(s). The serving node may also determine rates for the UE(s) on the available resources based on the transmit PSD levels for the UE(s) and the target IoT levels for the serving node. The serving node may assign the available resources to the UE(s). The serving node may also determine an overall rate for each UE based on at least one resource assigned to the UE and the rate achieved by the UE on each assigned resource.

Various aspects and features of the disclosure are described in further detail below.

BRIEF DESCRIPTION OF THE DRAWINGS

FIG. 6 shows a process for performing resource partitioning by a node.

FIG. 7 shows a process for scheduling UEs.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
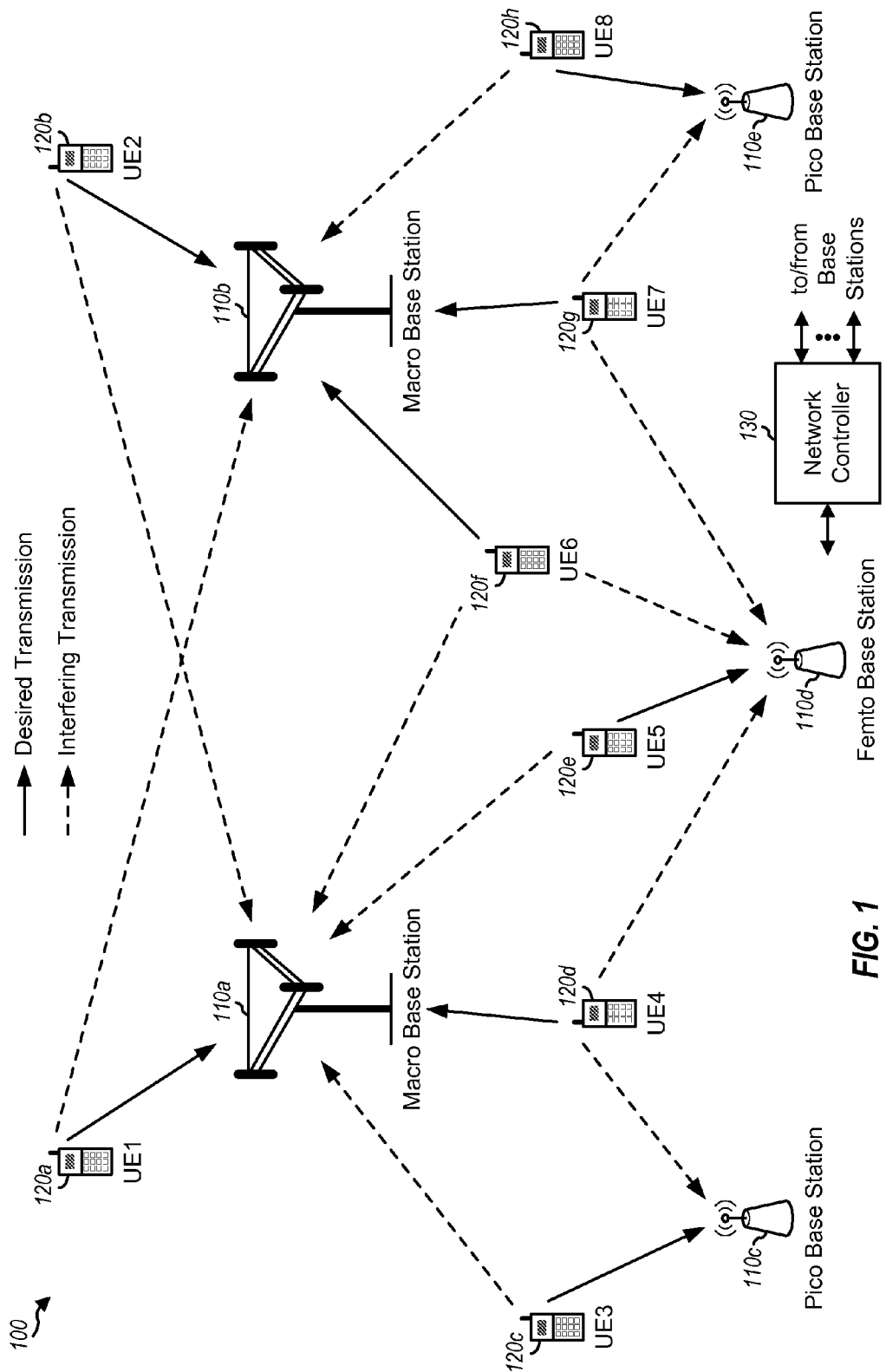
FIG. 1 shows a wireless communication network.

FIG. 1 shows a wireless communication network 100, which may include a number of base stations 110 and other network entities. A base station may be an entity that communicates with UEs and relay stations and may also be referred to as a node, a Node B, an evolved Node B (eNB), an access point, etc. Each base station may provide communication coverage for a particular geographic area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

A base station may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, wireless network 100 includes macro base stations 110a and 110b for macro cells, pico base stations 110c and 110e for pico cells, and a femto/home base station 110d for a femto cell.

Wireless network 100 may also include relay stations. A relay station may be an entity that receives a transmission of data from an upstream entity (e.g., a base station or a UE) and sends a transmission of the data to a downstream entity (e.g., a UE or a base station). A relay station may also be a UE that relays transmissions for other UEs. A relay station may also be referred to as a node, a station, a relay, a relay base station, etc.

Wireless network 100 may be a heterogeneous network that includes base stations of different types, e.g., macro base stations, pico base stations, femto base stations, relay stations, etc. These different types of base stations may have different transmit power levels, different coverage areas, and different impact on interference in wireless network 100. For example, macro base stations may have a high transmit power level (e.g., 20 Watts or 43 dBm), pico base stations and relay stations may have a lower transmit power level (e.g., 2 Watts or 33 dBm), and femto base stations may have a low transmit power level (e.g., 0.2 Watts or 23 dBm). Different types of base stations may belong in different power classes having different maximum transmit power levels.

A network controller 130 may couple to a set of base stations and may provide coordination and control for these base stations. Network controller 130 may communicate with base stations 110 via a backhaul. Base stations 110 may also communicate with one another via the backhaul.

UEs 120 may be dispersed throughout wireless network 100, and each UE may be stationary or mobile. A UE may also be referred to as a station, a terminal, a mobile station, a subscriber unit, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with base stations, relay stations, other UEs, etc.

A UE may be located within the coverage of one or more base stations. In one design, a single base station may be selected to serve the UE on both the downlink and uplink. In another design, one base station may be selected to serve the UE on each of the downlink and uplink. For both designs, a serving base station may be selected based on a metric such as maximum geometry, minimum pathloss, maximum energy/interference efficiency, maximum user throughput, etc. Geometry relates to received signal quality, which may be quantified by a carrier-over-thermal (CoT), a signal-to-noise ratio (SNR), a signal-to-noise-and-interference ratio (SINR), a carrier-to-interference ratio (C/I), etc. Maximizing energy/interference efficiency may entail (i) minimizing a required transmit energy per bit or (ii) minimizing a received interference energy per unit of received useful signal energy. Part (ii) may correspond to maximizing the ratio of channel gain for an intended node to a sum of channel gains for all interfered nodes. Part (ii) may be equivalent to minimizing pathloss for the uplink but may be different for the downlink. Maximizing user throughput may take into account various factors such as the loading of a base station (e.g., the number of UEs currently served by the base station), the amount of resources allocated to the base station, the available backhaul capacity of the base station, etc.

The wireless network may support a set of resources for the uplink. The available resources may be defined based on time, or frequency, or both time and frequency, or some other criteria. For example, the available resources may correspond to different frequency subbands, or different time interlaces, or different time-frequency blocks, etc. A time interlace may include evenly spaced time slots, e.g., every S-th time slot, where S may be any integer value. The available resources may be defined for the entire wireless network.

The available resources for the uplink may be used by base stations in the wireless network in various manners. In one scheme, each base station may use all of the available resources. This scheme may result in some UEs achieving poor performance. For example, femto base station 110d in FIG. 1 may be located within the vicinity of macro base stations 110a and 110b, and a transmission from UE 120e to femto base station 110d may observe high interference due to a transmission from UE 120f to macro base station 110b. In another scheme, the available resources may be allocated to base stations based on a fixed resource partitioning. Each base station may then use its allocated resources for its UEs. This scheme may enable each base station to achieve good performance on its allocated resources. However, some base stations may be allocated more resources than required whereas some other base stations may require more resources than allocated, which may lead to suboptimal performance for the wireless network.

In an aspect, adaptive resource partitioning may be performed to dynamically allocate the available resources for the uplink to nodes so that good performance can be achieved. Resource partitioning may also be referred to as resource allocation, resource coordination, etc. For adaptive resource partitioning for the uplink, the available resources may be allocated to nodes by assigning each node with a list of target IoT levels for the available resources, as described below. Adaptive resource partitioning may be performed in a manner to maximize a utility function. Adaptive resource partitioning is in contrast to fixed or static resource partitioning, which allocates a fixed subset of the available resources to each node.

FIG. 1 shows uplink transmission from each UE to its serving node. As shown in FIG. 1, each node may receive desired transmissions from UEs served by that node as well as interfering transmissions from UEs communicating with neighbor nodes. An uplink transmission from a given UE may thus cause interference at each neighbor node.

A target IoT level for a given node p on a given resource r may indicate an amount of interference expected by node p on resource r. Neighbor nodes may control uplink transmissions from their UEs on resource r such that the total interference caused by these UEs is maintained at or below the target IoT level on resource r at node p. Correspondingly, node p may control uplink transmissions from its UEs on each resource such that the interference caused by the UEs is maintained at or below the target IoT level for each neighbor node on that resource.

A lower target IoT level for node p on a given resource may mean that the resource will be used less by neighbor nodes, since the amount of interference expected by node p will be lower. Hence, uplink transmissions from other UEs communicating with the neighbor nodes will be sent at lower transmit power levels in order to meet the lower target IoT level for node p. A target IoT level on the uplink may be equivalent to a transmit PSD level on the downlink.

In one design, adaptive resource partitioning may be performed in a centralized manner. In this design, a designated entity may receive pertinent information for UEs and nodes, compute metrics for resource partitioning, select the best resource partitioning based on the computed metrics, and provide a list of target IoT levels corresponding to the selected resource partitioning for each node. In another design, adaptive resource partitioning may be performed in a distributed manner by a set of nodes. In this design, each node may compute certain metrics and may exchange metrics with neighbor nodes. The metric computation and exchange may be performed for one or more rounds. Each node may then determine/select the resource partitioning that can provide the best performance.

Table 1 lists a set of components that may be used for adaptive resource partitioning for the uplink.

TABLE 1

| Component | Description |
| --- | --- |
| Active Set | A set of nodes maintained for a given UE t and denoted as AS(t). |
| Neighbor Set | A set of nodes maintained for a given node p and denoted as NS(p). |
| Resources | Time and/or frequency resources that may be allocated to nodes. |
| Target IoT Levels | A list of target IoT levels for a node on available resources. |
| Utility Function | A function used to quantify the performance of different possible resource partitioning. |

In one design, an active set may be maintained for each UE and may be determined based on pilot measurements made by the UE and/or pilot measurements made by nodes. An active set for a given UE t may include nodes that (i) have non-negligible contribution to signal or interference observed by UE t on the downlink and/or (ii) receive non-negligible signal or interference from UE t on the uplink. In one design, a node may be included in the active set of UE t if the CoT of this node is greater than a threshold of $CoT_{min}$. A node may also be included in the active set based on received signal strength, pathloss, and/or other criteria. The active set may be limited in order to reduce computation complexity for adaptive resource partitioning. In one design, the active set may be limited to N nodes and may include up to N strongest nodes with CoT exceeding $CoT_{min}$, where N may be any suitable value.

In one design, a neighbor set may be maintained for each node and may include nodes that participate in adaptive resource partitioning. The neighbor set for each node may be determined based on active sets of UEs. In one design, a neighbor set for a given node p may include (i) nodes that are in the active sets of UEs served by node p and (ii) nodes serving UEs that have node p in their active sets. The neighbor set may thus include node p and its neighbor nodes.

Figure 2:
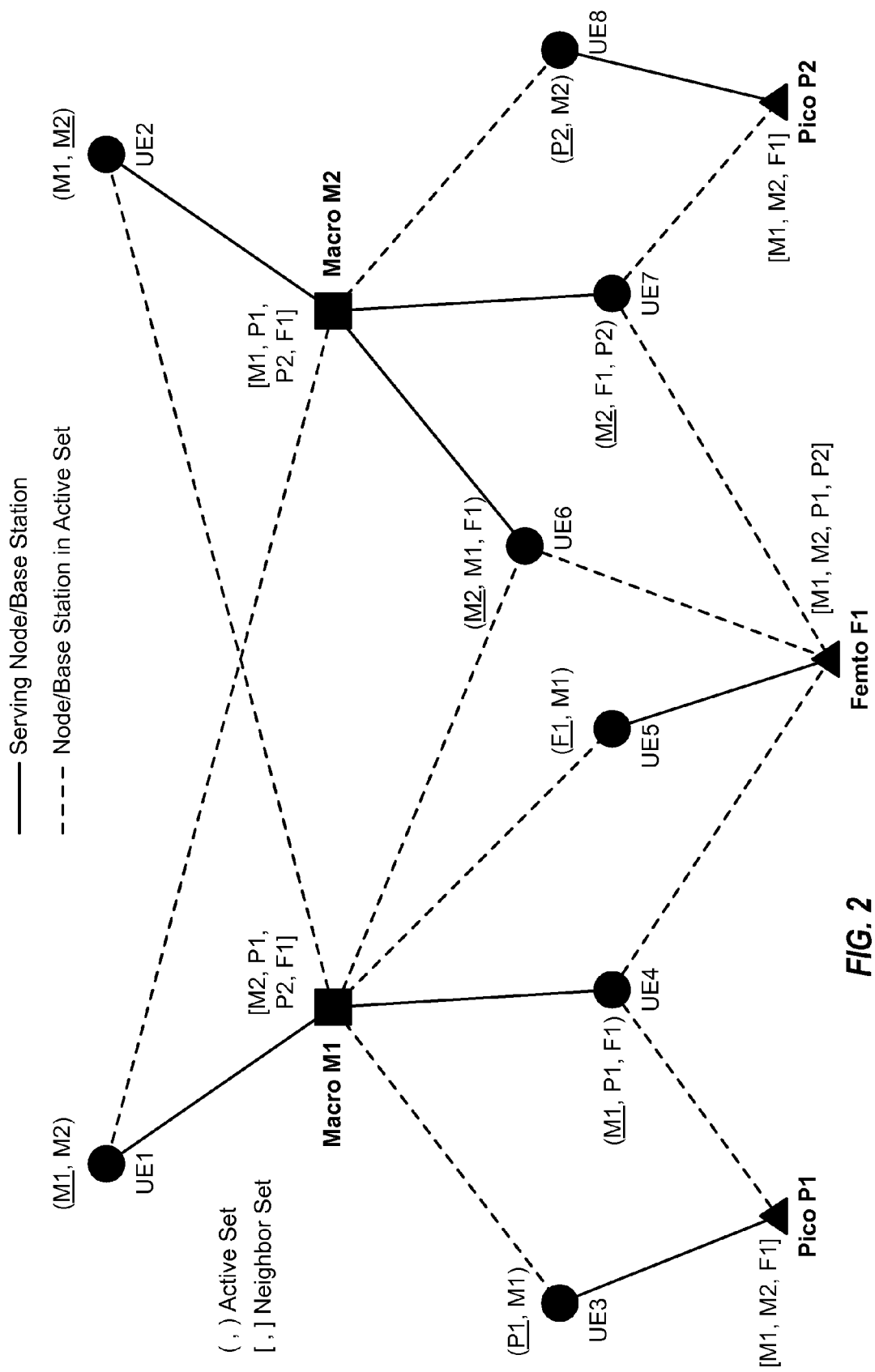
FIG. 2 shows exemplary active sets for UEs and neighbor sets for nodes.

FIG. 2 shows exemplary active sets for UEs and exemplary neighbor sets for nodes in FIG. 1. The active set for each UE is shown within parenthesis next to the UE in FIG. 2, with the serving node/base station being underlined. For example, the active set for UE1 is {M1, M2}, which means that the active set includes serving node M1 and neighbor node M2. The neighbor set for each node is shown within brackets next to the node in FIG. 2. For example, the neighbor set for node M1 is [M2, P1, P2, F1] and includes macro node M2, pico nodes P1 and P2, and femto node F1.

In one design, a list of target IoT levels for a given node p may be mapped to a list of target interference levels for node p for each neighbor node. A target interference level may also be referred to as an open loop projection target. The total noise and interference observed by node p on a given resource r may be equal to thermal noise plus total interference from UEs communicating with the neighbor nodes. The target IoT level for node p on resource r may be mapped to an expected total interference observed by node p from UEs served by the neighbor nodes. In one design, the expected total interference may be divided equally among all neighbor nodes. The target interference levels may then be defined as follows:

$$I_{target}(p, r) = \frac{IoT_{target}(p, r) - 1}{N_{neighbor}(p, r)}, \quad \text{Eq (1)}$$

where
$IoT_{target}(p,r)$ is a target IoT level for node p on resource r,
$I_{target}(p,r)$ is a target interference level (or open loop projection target) for node p on resource r for each neighbor node, and
$N_{neighbor}(p,r)$ is the number of neighbor nodes that use resource r.

In equation (1), the numerator gives the total interference observed by node p on resource r by subtracting 1 for thermal noise from the target IoT level. The total interference is given in thermal noise units. The total interference is divided by the number of neighbor nodes using resource r to obtain the target interference level for node p on resource r for each neighbor node. For example, the target IoT level for node p on resource r may be 6 decibels (dB) and may correspond to an expected total noise and interference that is four times thermal noise. The expected total interference on resource r may be three thermal noise units. If node p has three neighbor nodes using resource r, then the expected interference from each neighbor node on resource r may be one thermal noise unit. Each neighbor node may control uplink transmissions from its UEs such that these uplink transmissions will be at or below the target interference level for the neighbor node at node p.

Node p may obtain a list of target IoT levels for each neighbor node and may determine a list of target interference levels for that neighbor node. For each UE served by node p, a set of transmit PSD levels may be computed for each resource based on the target interference levels for all neighbor nodes in the active set of the UE, as follows:

$$PSD(t, q, r) = \frac{I_{target}(q, r) \cdot N_0}{G(q, t)}, \quad \text{Eq (2)}$$

where $I_{target}(q,r)$ is a target interference level for neighbor node q on resource r, which is determined by the target IoT level for base station q on resource r, G(q,t) is a channel gain between UE t and neighbor node q, PSD(t, q, r) is a transmit PSD level for UE t on resource r that can meet the target interference level for neighbor node q on resource r, and $N_0$ is ambient interference and thermal noise observed by node p.

The transmit PSD level for UE t on each resource may be selected as follows:

$$PSD(t, r) \le \min_{q \in AS(t), q \ne S(t)} PSD(t, q, r), \quad \text{Eq (3)}$$

where S(t) is a serving node for UE t.

In equation (2), the transmit PSD that UE t can use on resource r may be computed for each neighbor node q based on the channel gain between UE t and neighbor node q and the target interference level for neighbor node q on resource r. The channel gains for the neighbor nodes may be obtained based on pilot measurements from UE t. A set of transmit PSD levels may be obtained for all neighbor nodes in the active set of UE t for resource r. The smallest transmit PSD level in the set may be selected as the transmit PSD level for UE t on resource r. This would then ensure that the interference caused by UE t on resource r will not exceed the target interference level for any neighbor node on resource r. Equation (2) is based on open loop projection using channel gains. The target IoT may be achieved with closed loop power control for UEs.

The transmit PSD levels for UE t on all resources may be limited by the maximum transmit power level of UE t, as follows:

$$\sum_r PSD(t, r) \cdot W(r) \le P_{max}(t), \quad \text{Eq (4)}$$

where W(r) is the bandwidth of resource r, and $P_{max}(t)$ is the maximum transmit power level of UE t.

The spectral efficiency of UE t on resource r may be estimated based on an assumption that serving node p will observe the target IoT level on resource r, as follows:

$$SE(t, r) = C\left(\frac{PSD(t, r) \cdot G(p, t)}{N_0 \cdot IoT_{target}(p, r)}\right), \quad \text{Eq (5)}$$

where

G(p,t) is a channel gain between serving node p and UE t,

SE(t,r) is a spectral efficiency of UE t on resource r, and

C( ) denotes a capacity function.

In equation (5), the numerator within the parenthesis denotes the desired received power for UE t at serving node p. The denominator denotes the expected total noise and interference at serving node p. The channel gain between UE t and serving node p may be obtained based on pilot measurements from UE t. The capacity function may be a constrained capacity function, an unconstrained capacity function, or some other function. As shown in equation (5), the spectral efficiency of UE t on resource r is dependent on (i) the transmit PSD for UE t on resource r, which is dependent on the target IoT levels for the neighbor nodes on resource r, and (ii) the target IoT level for node p on resource r. The target IoT levels thus affect both the numerator and denominator of equation (5).

The rate that UE t can achieve on all resources may be dependent on which resources are assigned to UE t. In one design, the rate for UE t may be estimated by assuming that UE t is assigned a fraction of each available resource. This fraction may be denoted as $\alpha(t,r)$ and may be viewed as the fraction of time during which resource r is assigned to UE t. The rate for UE t may then be computed as follows:

$$R(t) = \sum_r \alpha(t, r) \cdot SE(t, r) \cdot W(r) = \sum_r \alpha(t, r) \cdot R(t, r), \quad \text{Eq (6)}$$

where R(t,r) is the rate for UE t on resource r, and

R(t) is the rate for UE t on all resources.

A pre-scheduler may perform scheduling forecast and may maximize the utility function over the space of the $\alpha(t,r)$ parameter, as follows:

$$\text{maximize } U(p), \text{ for } 0 \le \alpha(t, r) \le 1 \text{ and } \sum_{S(t)=p} \alpha(t, r) \le 1, \quad \text{Eq (7)}$$

where U(p) denotes a utility function for node p.

Utility function U(p) for node p may be defined in various manners. For example, utility function U(p) may be equal to the sum of rates of all UEs served by node p, or equal to the minimum of rates of all served UEs, or equal to the sum of the log of the rates of all served UEs, or equal to some other function of rate, latency, queue size, etc. In one design, the utility function for node p may be defined as follows:

$$U(p) = \sum_{S(t)=p} f(t) = \sum_{S(t)=p} f(R(t)) = \sum_{S(t)=p} f\left(\sum_r \alpha(t, r) \cdot R(t, r) \cdot W(r)\right), \quad \text{Eq (8)}$$

where $f(t)$ denotes a metric function for UE t.

Function $f(t)$ for UE t may be defined in various manners. For example, function $f(t)$ may be equal to rate and given as $f(t)=R(t)$, or equal to the log of rate and given as $f(t)=\log R(t)$, or equal to the log of log of rate and given as $f(t)=\log \{\log$ R(t)}, or equal to one over the cube of rate and given as $f(t)=-1/R(t)^3$, or equal to some other function of rate, latency, queue size, etc. Function $f(t)$ may also be defined to capture minimum guaranteed rates of UEs, e.g., by selecting a large slope before a guaranteed rate.

The rate for UE t may be constrained as follows:

$$R(t) \le R_{max}(t), \qquad \text{Eq (9)}$$

where $R_{max}(t)$ is the maximum rate supported by UE t. $R_{max}(t)$ may be given by a traffic profile or may be estimated based on past statistics. For a relay station, $R_{max}(t)$ may represent the access link capacity of the relay station.

An overall rate R(p) for node p may also be constrained as follows:

$$R(p) = \sum_{S(t)=p} R(t) \le R_{BH}(p), \qquad \text{Eq (10)}$$

where $R_{BH}(p)$ is a backhaul rate for node p.

In one design, an adaptive algorithm may be used for resource partitioning. The algorithm is adaptive in that it can take into consideration the current operating scenario, which may be different for different parts of the wireless network and may also change over time. The adaptive algorithm may be performed by each node in a distributed manner and may attempt to maximize the utility function over a set of nodes or possibly across the entire wireless network.

Figure 3:
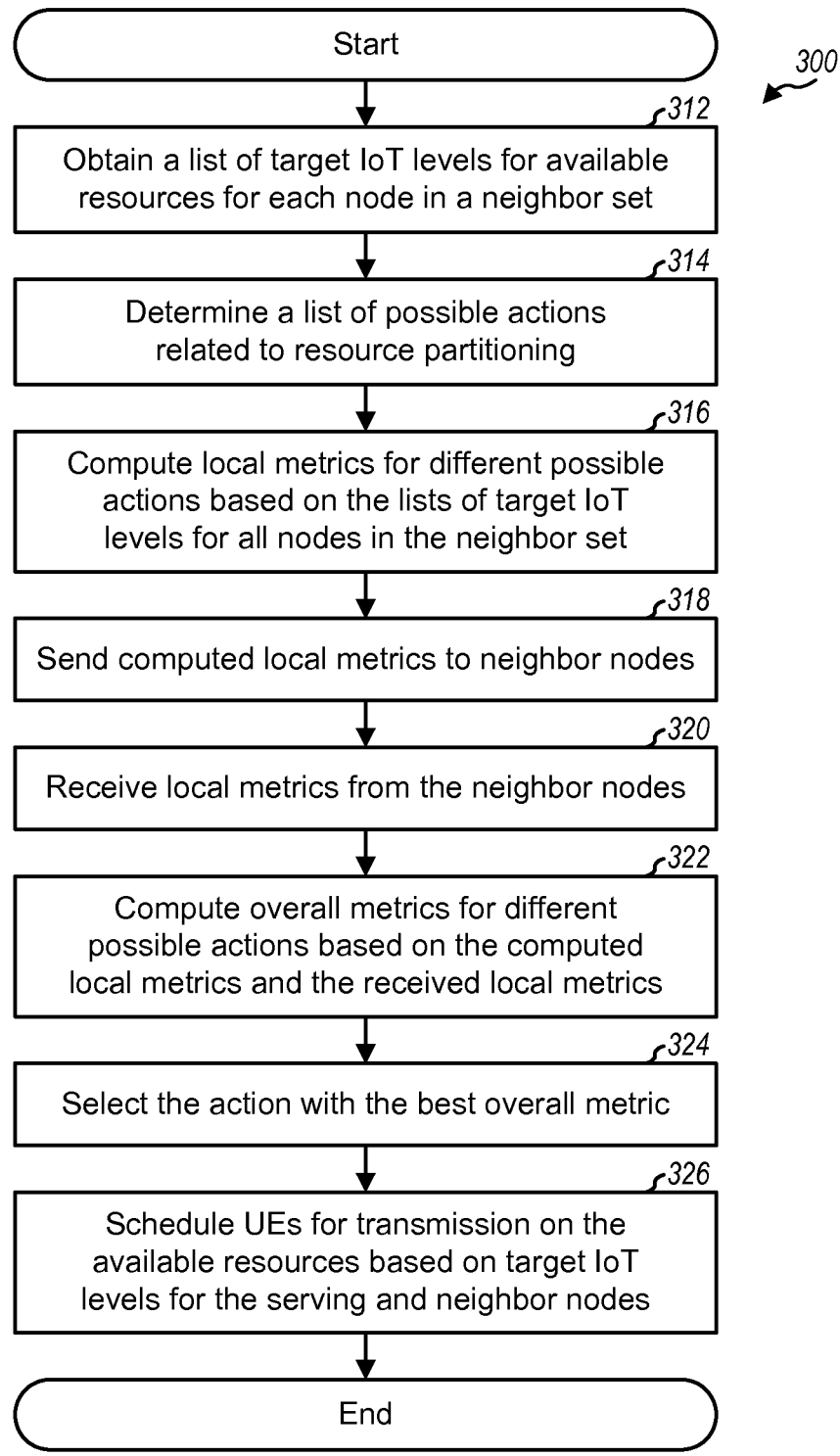
FIG. 3 shows a process for performing resource partitioning for the uplink.

FIG. 3 shows a design of a process 300 for performing adaptive resource partitioning for the uplink. Process 300 may be performed by each node in a neighbor set for a distributed design. For clarity, process 300 is described below for node p. Node p may obtain a list of target IoT levels for available resources for each node in the neighbor set (step 312). Node p may obtain the target IoT levels for the neighbor nodes via the backhaul or through other means.

Node p may determine a list of possible actions related to resource partitioning that can be performed by node p and/or neighbor nodes (step 314). Each possible action may correspond to a specific list of target IoT levels for node p as well as a specific list of target IoT levels for each neighbor node. For example, a possible action may entail node p changing its target IoT level on a particular resource and/or a neighbor node changing its target IoT level on the resource. The list of possible actions may include (i) standard actions that may be evaluated periodically without any explicit request and/or (ii) on-demand actions that may be evaluated in response to requests from neighbor nodes. Some possible actions are described below. The list of possible actions may be denoted as A.

Node p may compute local metrics for different possible actions based on the lists of target IoT levels for all nodes in the neighbor set (block 316). For each possible action, node p may compute a target interference level for each neighbor node on each resource based on the target IoT level for the neighbor node on the resource, e.g., as shown in equation (1). Node p may compute transmit PSD levels for its UEs on the available resources based on the target interference levels and the channel gains between the UEs and the neighbor nodes, e.g., as shown in equation (2). Node p may compute rates for the UEs based on the transmit PSD levels for the UEs and the target IoT levels for node p on the available resources, e.g., as shown in equations (5) and (6). Node p may then compute a local metric for the possible action based on a utility function of the rates for the UEs and/or other parameters, e.g., as shown in equation (8). A local metric may indicate the performance of a node for a given action. For example, a local metric based on a sum rate utility function may indicate the overall rate achieved by node p for a particular action a and may be computed as follows:

$$U(p, a) = \sum_{S(t)=p} R(t, a), \qquad \text{Eq (11)}$$

where R(t,a) is a rate for UE t on all available resources for action a, and
U(p,a) is a local metric for node p for action a.

The rate R(t,a) for each UE may be computed as shown in equations (1) through (6), where $IoT_{target}(q,r)$ in equation (2) and $IoT_{target}(p, r)$ in equation (5) target (AO may be dependent on the lists of target IoT levels for nodes q and p, respectively, for possible action a. In the design shown in equation (11), the rate for each UE on all available resources may first be determined, and the rates for all UEs served by node p may then be summed to obtain the local metric for node p. In another design, the rate for each UE on each available resource may first be determined, the rates for all UEs on each available resource may then be computed, and the rates for all available resources may be summed to obtain the local metric for node p. The local metric for node p for each possible action may also be computed in other manners and may be dependent on the utility function.

The local metrics for different possible actions may be used by node p as well as the neighbor nodes to compute overall metrics for different possible actions. Node p may send its computed local metrics U(p,a), for a∈A, to the neighbor nodes (block 318). Node p may also receive local metrics U(q,a), for a∈A, from each neighbor node q in the neighbor set (block 320). Node p may compute overall metrics for different possible actions based on its computed local metrics and the received local metrics (block 322). For example, an overall metric based on the sum rate utility function may be computed for each possible action a, as follows:

$$V(a) = U(p, a) + \sum_{q \in NS(p) \setminus \{p\}} U(q, a), \qquad \text{Eq (12)}$$

where V(a) is an overall metric for possible action a.

The summation in equation (12) is over all nodes in the neighbor set except for node p. The computation of the overall metric may be modified accordingly for other types of utility function. For example, a summation for the overall metric may be replaced with a minimum operation for a utility function that minimizes a particular parameter.

After completing the metric computation, node p may select the action with the best overall metric (block 324). Each neighbor node may similarly compute overall metrics for different possible actions and may also select the action with the best overall metric. Node p and the neighbor nodes should select the same action if they operate on the same set of local metrics. Each node may then operate based on the selected action, without having to communicate with one another regarding the selected action. However, node p and its neighbor nodes may operate on different local metrics and may obtain different best overall metrics. This may be the case, for example, if node p and its neighbor nodes have different neighbor sets. In this case, node p may negotiate with the neighbor nodes to determine which action to take. This may entail exchanging overall metrics for some promising actions between the nodes and selecting the action that can provide good performance for as many nodes as possible.

Regardless of how the best action is selected, the selected action is associated with a list of target IoT levels for node p and a list of target IoT levels for each neighbor node. Node p may schedule its UEs for transmission on the available resources based on its target IoT levels as well as the target IoT levels for the neighbor nodes (block 326). For example, node p may assign the available resources to its UEs. Node p may determine the transmit PSD level for each UE on each assigned resource based on the target IoT levels for all neighbor nodes on that resource. Node p may ensure that the transmit PSD level for each UE on each resource will not cause excessive interference to each neighbor node in the active set of that UE, e.g., as shown in equations (2) and (3). Node p may also determine a rate for each UE based on the transmit PSD level on each assigned resource and the target IoT levels for node p, e.g., as shown in equations (5) and (6), where $\alpha(t,r)=1$ for each assigned resource and $\alpha(t,r)=0$ for each unassigned resource. Node p may schedule each UE for data transmission at the rate determined for that UE.

In one design, a set of target IoT levels may be defined. A target IoT level for a node on a resource may be equal to one of the target IoT levels in the set. The target IoT levels for each node may thus be quantized based on the set of target IoT levels. This may reduce computation complexity for resource partitioning. In one design, a set of three target IoT levels may be used. Fewer or more target IoT levels may also be supported. In one design, the same set of target IoT levels may be used for all nodes. In another design, different sets of target IoT levels may be used for different nodes or different types of nodes. For example, one set of target IoT levels may be used for macro nodes/base stations and another set of target IoT levels may be used for pico and femto nodes/base stations.

There may be a large number of possible actions to evaluate for an exhaustive search to find the best action. The number of possible actions to evaluate may be reduced in various manners. In one design, each available resource may be treated independently, and a given action may change the target IoT level of only one resource. In another design, the number of nodes that can adjust their target IoT levels on a given resource for a given action may be limited. In yet another design, the target IoT for a given node on a given resource may be either increased or decreased by one level at a time. The number of possible actions may also be reduced via other simplifications.

In one design, a list of possible actions that may lead to good overall metrics may be evaluated. Possible actions that are unlikely to provide good overall metrics may be skipped in order to reduce computation complexity. For example, having both node p and a neighbor node increase their target IoT levels on the same resource will likely result in extra interference on the resource, which may degrade performance for both nodes. This possible action may thus be skipped.

Table 2 lists different types of actions that may be evaluated for adaptive resource partitioning for the uplink, in accordance with one design.

TABLE 2

Action Types

| Action Type | Description |
| --- | --- |
| p-C-r | Node p claims resource r and decreases its target IoT by one level on resource r. |

TABLE 2-continued

Action Types

| Action Type | Description |
| --- | --- |
| p-B-r | Node p blanks resource r and increases its target IoT by one level on resource r. |
| p-R-r-Q | Node p requests resource r from one or more neighbor nodes in set Q and asks the neighbor node(s) in set Q to increase their target IoT by one level on resource r. |
| p-G-r-Q | Node p grants resource r to one or more neighbor nodes in set Q and tells the neighbor node(s) in set Q to decrease their target IoT by one level on resource r. |
| p-CR-r-Q | Node p claims and requests resource r from one or more neighbor nodes in set Q and (i) decreases its target IoT by one level on resource r and (ii) asks the neighbor node(s) in set Q to increase their target IoT by one level on resource r. |
| p-BG-r-Q | Node p blanks and grants resource r to one or more neighbor nodes in set Q and (i) increases its target IoT by one level on resource r and (ii) tells the neighbor node(s) in set Q to decrease their target IoT by one level on resource r. |

Each action type in Table 2 may be associated with a set of possible actions of that type. For each action type involving only node p, K possible actions may be evaluated for K available resources. For each action type involving both node p and one or more neighbor nodes in set Q, multiple possible actions may be evaluated for each available resource, with the number of possible actions being dependent on the size of the neighbor set, the size of set Q, etc. Node p may compute a local metric for each possible action of each action type. The local metrics for all possible actions may be used to compute overall metrics for different possible actions.

Table 2 lists some types of actions that may be evaluated for adaptive resource partitioning for the uplink. Fewer, more and/or different action types may also be evaluated.

In one design, adaptive resource partitioning may be performed for all available resources for the uplink. In another design, adaptive resource partitioning may be performed for a subset of the available resources. For example, macro nodes may be allocated a first subset of the available resources and pico nodes may be allocated a second subset of the available resources based on fixed resource partitioning. The remaining available resources may be dynamically allocated to the macro nodes or the pico nodes based on adaptive resource partitioning.

Figures 4, 5:
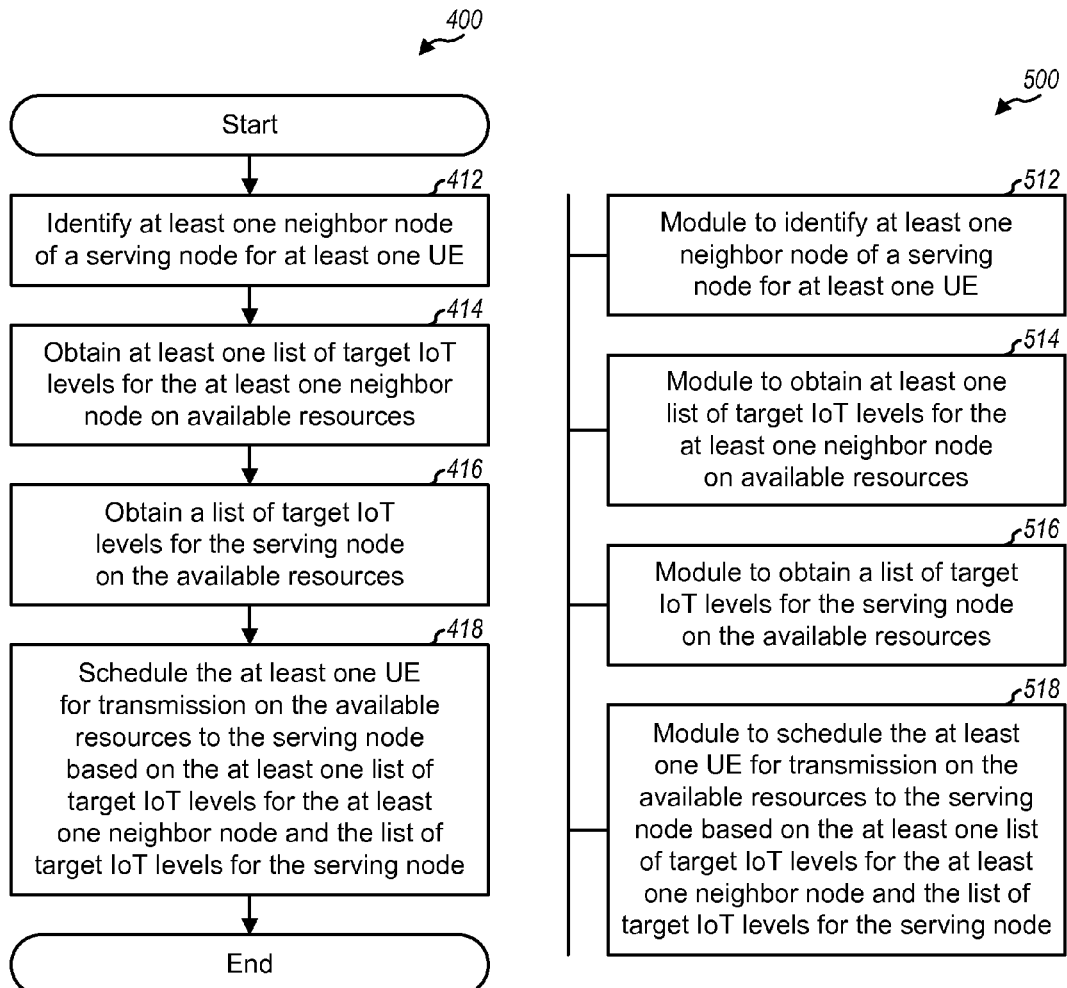
FIG. 4 shows a process for supporting communication by a node.
FIG. 5 shows an apparatus for supporting communication by a node.

FIG. 4 shows a design of a process 400 for supporting communication. Process 400 may be performed by a serving node (as described below) or by some other entity. The serving node may be a base station, a relay station, or some other entity. The serving node may identify at least one neighbor node, e.g., based on active sets of UEs communicating with the serving node and active sets of UEs communicating with the at least one neighbor node (block 412). The serving node may obtain at least one list of target IoT levels for the at least one neighbor node on available resources, one list of target IoT levels for each neighbor node (block 414). The serving node may also obtain a list of target IoT levels for itself on the available resources (block 416). Each list of target IoT levels may include K configurable target IoT levels on K available resources for an associated node, one target IoT level for each available resource. The serving node may schedule at least one UE for transmission on the available resources based on the at least one list of target IoT levels for the at least one neighbor node and the list of target IoT levels for the serving node (block 418).

In another design, the serving node may obtain a list of target interference levels (instead of a list of target IoT levels)

for each neighbor node. The target IoT levels obtained by the serving node in blocks 414 and 416 may thus generically refer to interference information in any suitable form.

FIG. 5 shows a design of an apparatus 500 for supporting communication. Apparatus 500 includes a module 512 to identify at least one neighbor node of a serving node for at least one UE, a module 514 to obtain at least one list of target IoT levels for the at least one neighbor node on available resources, a module 516 to obtain a list of target IoT levels for the serving node on the available resources, and a module 518 to schedule the at least one UE for transmission on the available resources to the serving node based on the at least one list of target IoT levels for the at least one neighbor node and the list of target IoT levels for the serving node.

FIG. 6 shows a design of a process 600 for performing adaptive resource partitioning for the uplink. Process 600 may be used for blocks 414 and 416 in FIG. 4 and may be performed by a serving node (as described below) or some other entity. The serving node may compute local metrics for a plurality of possible actions related to allocation of available resources to the serving node and at least one neighbor node in a neighbor set (block 612). Each possible action may be associated with a plurality of lists of target IoT levels for the serving and neighbor nodes. The serving node may send the computed local metrics to the at least one neighbor node to enable the neighbor node(s) to compute overall metrics for the plurality of possible actions (block 614). The serving node may receive local metrics for the plurality of possible actions from the at least one neighbor node (block 616). A local metric for a possible action may be indicative of the performance achieved by a node for the possible action. An overall metric for a possible action may be indicative of the overall performance achieved by the serving and neighbor nodes for the possible action.

The serving node may determine overall metrics for the plurality of possible actions based on the computed local metrics and the received local metrics for the plurality of possible actions, e.g., as shown in equation (12) (block 618). The serving node may select one of the plurality of possible actions based on the overall metrics, e.g., select the possible action with the best overall metric (block 620). The serving node may determine a list of target IoT levels for itself and at least one list of target IoT levels for the at least one neighbor node from the plurality of lists of target IoT levels associated with the selected action (block 622).

In one design of block 612, the serving node may compute a local metric for each possible action by first determining at least one rate for at least one UE based on the plurality of lists of target IoT levels associated with the possible action. The serving node may then determine the local metric for the possible action based on the at least one rate, e.g., as shown in equation (11). The local metrics may be computed based on a function of rate, or latency, or queue size, or a combination thereof. Various simplifications may be made to reduce computation complexity for adaptive resource partitioning. For example, each possible action may affect only one of the available resources, or may change the target IoT by at most one level for each node, or may be of one of a set of action types, etc.

FIG. 6 shows a distributed design in which a set of nodes may each compute and exchange local metrics and possibly overall metrics for different possible actions. For a centralized design, a designated entity may compute local metrics and overall metrics for different possible actions, select the best possible action, determine the lists of target IoT levels associated with the selected action for all nodes, and provide a list of target IoT levels to each node.

FIG. 7 shows a design of a process 700 for scheduling UEs. Process 700 may be used for block 418 in FIG. 4 and may be performed by a serving node (as described below) or some other entity. The serving node may obtain target interference levels for at least one neighbor node on available resources, which may be determined based on at least one list of target IoT levels for the at least one neighbor node (block 712). The serving node may compute the target interference levels for the neighbor nodes or may receive the target interference levels from the neighbor nodes. The target interference level for each neighbor node on each available resource may be determined based on (i) a target IoT level for the neighbor node on the available resource and (ii) the number of other nodes using the available resource, e.g., as shown in equation (1).

The serving node may determine transmit PSD levels for at least one UE on the available resources based on the target interference levels for the at least one neighbor node on the available resources (block 714). For each UE, the serving node may determine at least one transmit PSD level for the UE on each available resource based on (i) at least one target interference level for the at least one neighbor node on the available resource and (ii) at least one channel gain between the UE and the at least one neighbor node, e.g., as shown in equation (2). The serving node may select the smallest transmit PSD level among the at least one PSD level for the UE on each available resource, e.g., as shown in equation (3).

The serving node may determine rates $R(t,r)$ for the at least one UE based on (i) the transmit PSD levels for the at least one UE on the available resources and (ii) a list of target IoT levels for the serving node on the available resources, e.g., as shown in equations (5) and (6) (block 716). The serving node may assign the available resources to the at least one UE, and each UE may be assigned at least one resource (block 718). The resource assignment may be based on the rates achieved by the at least one UE on the available resources. The serving node may determine the rate $R(t)$ for each UE based on the at least one resource assigned to the UE and the rate $R(t,r)$ achieved by the UE on each assigned resource, e.g., as shown in equation (6) (block 720).

Figure 8:
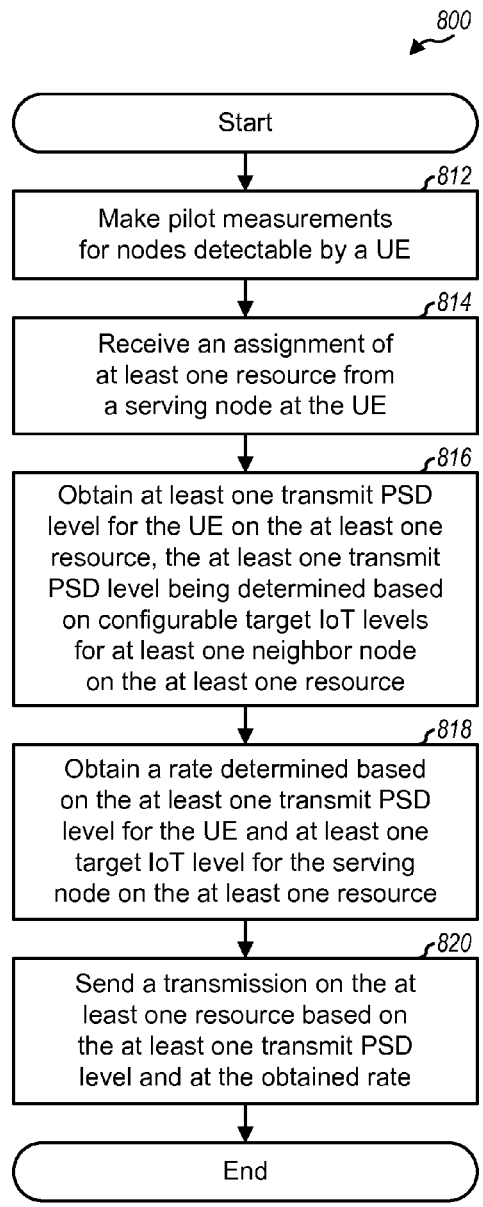
FIG. 8 shows a process for communicating by a UE.

FIG. 8 shows a design of a process 800 for communicating in a wireless network. Process 800 may be performed by a UE (as described below) or by some other entity. The UE may make pilot measurements for nodes detectable by the UE (block 812). The pilot measurements may be used to determine an active set for the UE, to compute metrics for adaptive resource partitioning, and/or for other purposes.

The UE may receive an assignment of at least one resource from a serving node (block 814). The UE may obtain at least one transmit PSD level for itself on the at least one resource (block 816). The at least one transmit PSD level may be determined based on configurable target IoT levels for at least one neighbor node on the at least one resource. The transmit PSD level may be computed via open loop projection (e.g., by the serving node) and/or may be adjusted via closed loop power control. The UE may obtain a rate $R(t)$ determined based on (i) the at least one transmit PSD level for the UE on the at least one resource and (ii) at least one target IoT level for the serving node on the at least one resource (block 818). The rate may be computed by the serving node and sent to the UE. The UE may send a transmission on the at least one resource based on the at least one transmit PSD level and at the obtained rate (block 820).

Figure 9:
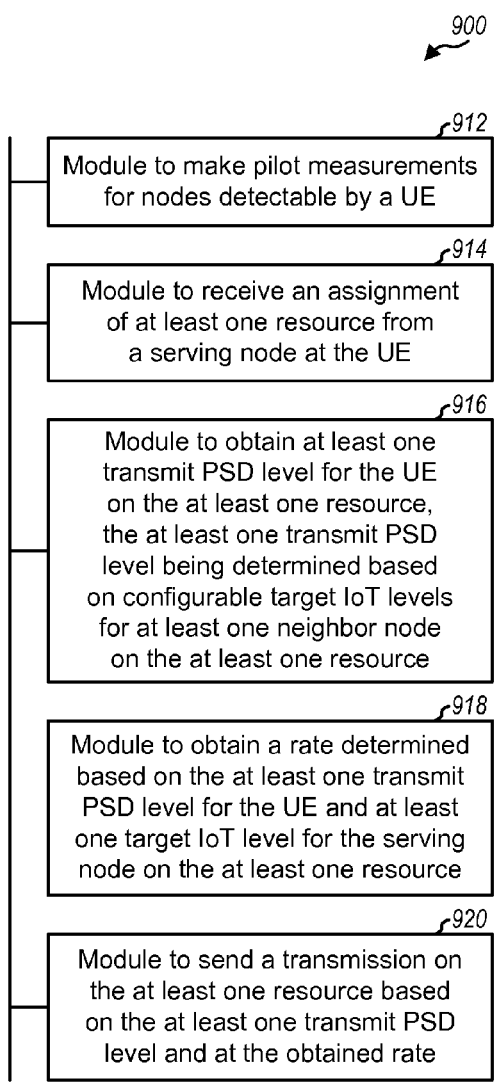
FIG. 9 shows an apparatus for communicating by a UE.

FIG. 9 shows a design of an apparatus 900 for communicating in a wireless network. Apparatus 900 includes a module 912 to make pilot measurements for nodes detectable by a UE, a module 914 to receive an assignment of at least one resource from a serving node at the UE, a module 916 to obtain at least one transmit PSD level for the UE on the at least one resource, the at least one transmit PSD level being determined based on configurable target IoT levels for at least one neighbor node on the at least one resource, a module 918 to obtain a rate determined based on the at least one transmit PSD level for the UE on the at least one resource and at least one target IoT level for the serving node on the at least one resource, and a module 920 to send a transmission on the at least one resource based on the at least one transmit PSD level and at the obtained rate.

The modules in FIGS. 5 and 9 may comprise processors, electronic devices, hardware devices, electronic components, logical circuits, memories, software codes, firmware codes, etc., or any combination thereof.

Figure 10:
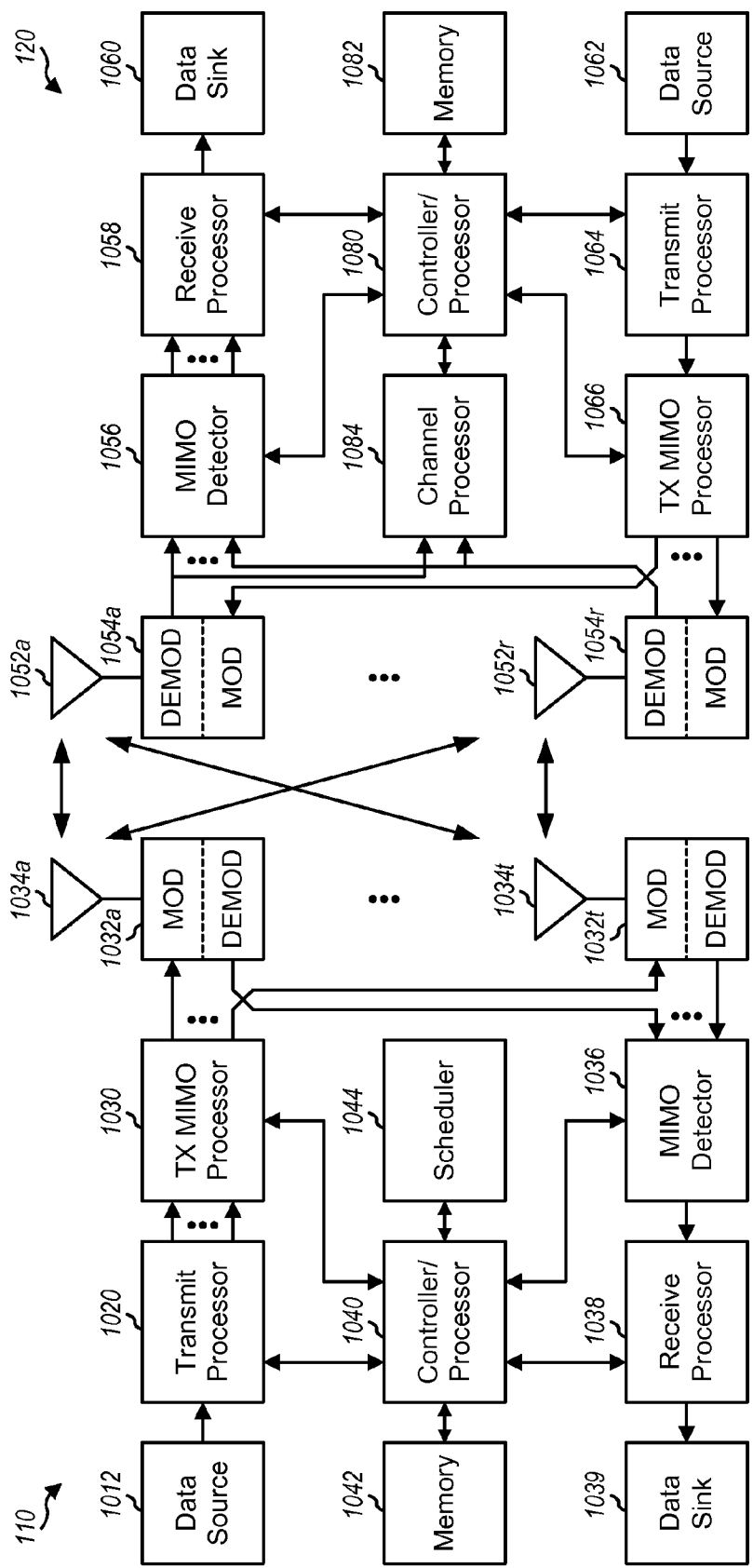
FIG. 10 shows a block diagram of a base station and a UE.

FIG. 10 shows a block diagram of a design of a base station/node 110 and a UE 120, which may be one of the base stations and one of the UEs in FIG. 1. Base station 110 may be equipped with T antennas 1034a through 1034t, and UE 120 may be equipped with R antennas 1052a through 1052r, where in general T≥1 and R≥1.

At base station 110, a transmit processor 1020 may receive data from a data source 1012 for one or more UEs and control information from a controller/processor 1040. Processor 1020 may process (e.g., encode, interleave, and modulate) the data and control information to obtain data symbols and control symbols, respectively. Processor 1020 may also generate pilot symbols for pilot or reference signal. A transmit (TX) multiple-input multiple-output (MIMO) processor 1030 may perform spatial processing (e.g., precoding) on the data symbols, the control symbols, and/or the pilot symbols, if applicable, and may provide T output symbol streams to T modulators (MODs) 1032a through 1032t. Each modulator 1032 may process a respective output symbol stream (e.g., for OFDM, etc.) to obtain an output sample stream. Each modulator 1032 may further process (e.g., convert to analog, amplify, filter, and upconvert) the output sample stream to obtain a downlink signal. T downlink signals from modulators 1032a through 1032t may be transmitted via T antennas 1034a through 1034t, respectively.

At UE 120, antennas 1052a through 1052r may receive the downlink signals from base station 110 and may provide received signals to demodulators (DEMODs) 1054a through 1054r, respectively. Each demodulator 1054 may condition (e.g., filter, amplify, downconvert, and digitize) its received signal to obtain input samples. Each demodulator 1054 may further process the input samples (e.g., for OFDM, etc.) to obtain received symbols. A MIMO detector 1056 may obtain received symbols from all R demodulators 1054a through 1054r, perform MIMO detection on the received symbols if applicable, and provide detected symbols. A receive processor 1058 may process (e.g., demodulate, deinterleave, and decode) the detected symbols, provide decoded data for UE 120 to a data sink 1060, and provide decoded control information to a controller/processor 1080.

On the uplink, at UE 120, a transmit processor 1064 may receive and process data from a data source 1062 and control information from controller/processor 1080. Processor 1064 may also generate pilot symbols for pilot or reference signal. The symbols from transmit processor 1064 may be precoded by a TX MIMO processor 1066 if applicable, further processed by modulators 1054a through 1054r (e.g., for SC-FDM, OFDM, etc.), and transmitted to base station 110. At base station 110, the uplink signals from UE 120 may be received by antennas 1034, processed by demodulators 1032, detected by a MIMO detector 1036 if applicable, and further processed by a receive processor 1038 to obtain decoded data and control information sent by UE 120. Processor 1038 may provide the decoded data to a data sink 1039 and the decoded control information to controller/processor 1040.

Controllers/processors 1040 and 1080 may direct the operation at base station 110 and UE 120, respectively. A channel processor 1084 may make pilot measurements, which may be used to determine an active set for UE 120 and to compute channel gains, transmit PSD levels, rates, metrics, etc. Processor 1040 and/or other processors and modules at base station 110 may perform or direct process 300 in FIG. 3, process 400 in FIG. 4, process 600 in FIG. 6, process 700 in FIG. 7, and/or other processes for the techniques described herein. Processor 1080 and/or other processors and modules at UE 120 may perform or direct process 800 in FIG. 8 and/or other processes for the techniques described herein. Memories 1042 and 1082 may store data and program codes for base station 110 and UE 120, respectively. A scheduler 1044 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    identifying at least one neighbor node of a serving node, the serving node serving at least one user equipment (UE);
    obtaining at least one list of target interference levels for the at least one neighbor node and corresponding to available resources;
    obtaining a list of target interference levels for the serving node and corresponding to the available resources; and
    scheduling the at least one UE for transmission on the available resources to the serving node, the scheduling being based on the at least one list of target interference levels for the at least one neighbor node and the list of target interference levels for the serving node.

2. The method of claim 1, wherein the scheduling the at least one UE comprises
    obtaining target interference levels for the at least one neighbor node, the target interference levels being determined based on the at least one list of target interference levels, and
    determining transmit power spectral density (PSD) levels for the at least one UE on the available resources based on the target interference levels for the at least one neighbor node.

3. The method of claim 2, wherein a target interference level for a neighbor node on an available resource is determined based on a target interference level for the neighbor node on the available resource and number of other nodes using the available resource.

4. The method of claim 2, wherein the determining the transmit PSD levels comprises, for each UE,
    determining at least one transmit PSD level for the UE on each available resource based on at least one target interference level for the at least one neighbor node and at least one channel gain between the UE and the at least one neighbor node, and
    selecting a smallest transmit PSD level among the at least one PSD level for the UE on each available resource.

5. The method of claim 2, wherein the scheduling the at least one UE further comprises determining rates for the at least one UE based on the transmit PSD levels for the at least one UE and the list of target interference levels for the serving node.

6. The method of claim 1, further comprising:
    obtaining overall metrics for a plurality of possible actions related to allocation of the available resources to the serving node and the at least one neighbor node, wherein each possible action is associated with a plurality of lists of target interference levels for the serving node and the at least one neighbor node;
    selecting one of the plurality of possible actions based on the overall metrics; and
    determining the list of target interference levels for the serving node and the at least one list of target interference levels for the at least one neighbor node from the plurality of lists of target interference levels associated with the selected action.

7. The method of claim 6, further comprising:
    computing local metrics for the plurality of possible actions by the serving node; and
    receiving local metrics for the plurality of possible actions from the at least one neighbor node, and
    wherein the obtaining the overall metrics comprises determining the overall metrics for the plurality of possible actions based on the computed local metrics and the received local metrics for the plurality of possible actions.

8. The method of claim 7, wherein a local metric for a possible action is indicative of performance achieved by a node for the possible action, and wherein an overall metric for a possible action is indicative of overall performance achieved by the serving node and the at least one neighbor node for the possible action.

9. The method of claim 7, further comprising:
    sending the computed local metrics to the at least one neighbor node to enable the at least one neighbor node to compute the overall metrics for the plurality of possible actions.

10. The method of claim 7, wherein the computing the local metrics comprises, for each possible action,
   determining at least one rate for the at least one UE based on the plurality of lists of target interference levels associated with the possible action, and
   determining a local metric for the possible action based on the at least one rate.

11. The method of claim 7, wherein the local metrics for the plurality of possible actions are computed based on a function of rate, or latency, or queue size, or a combination thereof.

12. The method of claim 6, wherein each possible action affects only one of the available resources.

13. The method of claim 6, wherein each possible action changes target interference by at most one level for any one node.

14. The method of claim 6, wherein each possible action is of one of a set of action types.

15. The method of claim 1, wherein the determining the at least one neighbor node comprises determining the at least one neighbor node based on active sets of UEs communicating with the serving node and active sets of UEs communicating with the at least one neighbor node.

16. An apparatus for wireless communication, comprising:
   means for identifying at least one neighbor node of a serving node, the serving node serving at least one user equipment (UE);
   means for obtaining at least one list of target interference levels for the at least one neighbor node and corresponding to available resources;
   means for obtaining a list of target interference levels for the serving node and corresponding to the available resources; and
   means for scheduling the at least one UE for transmission on the available resources to the serving node, wherein the means for scheduling schedules the at least one UE based on the at least one list of target interference levels for the at least one neighbor node and the list of target interference levels for the serving node.

17. The apparatus of claim 16, wherein the means for scheduling the at least one UE comprises
   means for obtaining target interference levels for the at least one neighbor node, the target interference levels being determined based on the at least one list of target interference levels, and
   means for determining transmit power spectral density (PSD) levels for the at least one UE on the available resources based on the target interference levels for the at least one neighbor node.

18. The apparatus of claim 17, wherein the means for obtaining the target interference levels comprises, for each neighbor node, means for determining a target interference level for the neighbor node on each available resource based on a target interference level for the neighbor node on the available resource and number of neighbor nodes using the available resource.

19. The apparatus of claim 17, wherein the means for determining the transmit PSD levels comprises, for each UE,
   means for determining at least one transmit PSD level for the UE on each available resource based on at least one target interference level for the at least one neighbor node and at least one channel gain between the UE and the at least one neighbor node, and
   means for selecting a smallest transmit PSD level among the at least one PSD level for the UE on each available resource.

20. The apparatus of claim 17, wherein the means for scheduling the at least one UE further comprises means for determining rates for the at least one UE based on the transmit PSD levels for the at least one UE and the list of target interference levels for the serving node.

21. The apparatus of claim 16, further comprising:
   means for obtaining overall metrics for a plurality of possible actions related to allocation of the available resources to the serving node and the at least one neighbor node, wherein each possible action is associated with a plurality of lists of target interference levels for the serving node and the at least one neighbor node;
   means for selecting one of the plurality of possible actions based on the overall metrics; and
   means for determining the list of target interference levels for the serving node and the at least one list of target interference levels for the at least one neighbor node from the plurality of lists of target interference levels associated with the selected action.

22. The apparatus of claim 21, further comprising:
   means for computing local metrics for the plurality of possible actions by the serving node; and
   means for receiving local metrics for the plurality of possible actions from the at least one neighbor node, and
   wherein the means for obtaining the overall metrics comprises means for determining the overall metrics for the plurality of possible actions based on the computed local metrics and the received local metrics for the plurality of possible actions.

23. An apparatus for wireless communication, comprising:
   at least one processor configured
      to identify at least one neighbor node of a serving node, the serving node serving at least one user equipment (UE),
      to obtain at least one list of target interference levels for the at least one neighbor node and corresponding to available resources,
      to obtain a list of target interference levels for the serving node and corresponding to the available resources, and
      to schedule the at least one UE for transmission on the available resources to the serving node, the scheduling being based on the at least one list of target interference levels for the at least one neighbor node and the list of target interference levels for the serving node.

24. A computer program product, including a non-transitory computer-readable medium comprising code for causing at least one computer to:
   identify at least one neighbor node of a serving node, the serving node serving at least one user equipment (UE),
   obtain at least one list of target interference levels for the at least one neighbor node and corresponding to available resources,
   obtain a list of target interference levels for the serving node and corresponding to available resources, and
   schedule the at least one UE for transmission on the available resources to the serving node, the scheduling being based on the at least one list of target interference levels for the at least one neighbor node and the list of target interference levels for the serving node.

* * * * *